United States Patent
Hilal et al.

(10) Patent No.: US 11,048,869 B2
(45) Date of Patent: *Jun. 29, 2021

(54) DIGITAL ASSISTANT AND ASSOCIATED METHODS FOR A TRANSPORTATION VEHICLE

(71) Applicant: Panasonic Avionics Corproation, Lake Forest, CA (US)

(72) Inventors: Rawad Hilal, Placentia, CA (US); Gurmukh Khabrani, Irvine, CA (US); Chin Perng, San Diego, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/728,811

(22) Filed: Dec. 27, 2019

(65) Prior Publication Data
US 2020/0135183 A1  Apr. 30, 2020

Related U.S. Application Data

(60) Division of application No. 15/954,271, filed on Apr. 16, 2018, now Pat. No. 10,573,299, which is a (Continued)

(51) Int. Cl.
*G10L 15/16* (2006.01)
*G06F 40/20* (2020.01)
(Continued)

(52) U.S. Cl.
CPC .......... *G06F 40/20* (2020.01); *B60R 11/0235* (2013.01); *B60R 11/0264* (2013.01);
(Continued)

(58) Field of Classification Search
None
See application file for complete search history.

(56) References Cited

U.S. PATENT DOCUMENTS 8,204,751 B1   6/2012  Di Fabbrizio et al.
8,219,407 B1   7/2012  Roy et al.
(Continued)

OTHER PUBLICATIONS

Shih, Kai-Chin; "China Eastern trials 'intelligent personal assistant' for in-flight service"; airlinetrends.com; http://www.airlinetrends.com/2015/02/15/china-eastern-trials-intelligent-personal-assistant-for-in-flight-service/print/; Feb. 15, 2015.
(Continued)

*Primary Examiner* — Richard Z Zhu
(74) *Attorney, Agent, or Firm* — Klein, O'Neill & Singh, LLP

(57) ABSTRACT

Methods and systems for a transportation vehicle are provided. One method includes receiving a user input for a valid communication session by a processor executable, digital assistant at a device on a transportation vehicle; tagging by the digital assistant, the user input words with a grammatical connotation; generating an action context, a filter context and a response context by a neural network, based on the tagged user input; storing by the digital assistant, a key-value pair for a parameter of the filter context at a short term memory, based on an output from the neural network; updating by the digital assistant, the key-value pair at the short term memory after receiving a reply to a follow-up request and another output from the trained neural network; and providing a response to the reply by the digital assistant.

20 Claims, 15 Drawing Sheets

Related U.S. Application Data continuation-in-part of application No. 15/241,376, filed on Aug. 19, 2016, now Pat. No. 9,972,312.

(51) Int. Cl.

| | | |
|---|---|---|
| *G10L 15/18* | (2013.01) | |
| *G10L 15/22* | (2006.01) | |
| *G06N 3/04* | (2006.01) | |
| *B60R 11/02* | (2006.01) | |
| *G10L 15/06* | (2013.01) | |
| *G06N 3/08* | (2006.01) | |
| *G06N 5/00* | (2006.01) | |
| *G10L 15/26* | (2006.01) | |
| *G06N 7/00* | (2006.01) | |
| *G10L 15/183* | (2013.01) | |

(52) U.S. Cl.
CPC ............... *G06N 3/04* (2013.01); *G06N 3/084* (2013.01); *G06N 5/003* (2013.01); *G10L 15/063* (2013.01); *G10L 15/16* (2013.01); *G10L 15/1822* (2013.01); *G10L 15/22* (2013.01); *G06N 7/005* (2013.01); *G10L 15/183* (2013.01); *G10L 15/26* (2013.01); *G10L 2015/223* (2013.01)

(56) References Cited

U.S. PATENT DOCUMENTS

| | | | |
|---|---|---|---|
| 8,515,763 B2 | 8/2013 | Dong et al. | |
| 9,437,206 B2 | 9/2016 | Yu et al. | |
| 10,274,911 B2 | 4/2019 | Uppala et al. | |
| 10,546,067 B2* | 1/2020 | Gelfenbeyn | G06F 40/268 |
| 2004/0111264 A1 | 6/2004 | Wang et al. | |
| 2005/0288935 A1 | 12/2005 | Lee et al. | |
| 2008/0201148 A1 | 8/2008 | Desrochers | |
| 2010/0217458 A1 | 8/2010 | Schweiger et al. | |
| 2011/0121999 A1 | 5/2011 | Sandell et al. | |
| 2012/0323577 A1 | 12/2012 | Correia et al. | |
| 2014/0002278 A1 | 1/2014 | Boomgaarden et al. | |
| 2014/0052444 A1* | 2/2014 | Roberge | G10L 15/08 704/243 |
| 2014/0242910 A1 | 8/2014 | Umlauft et al. | |
| 2015/0039292 A1 | 2/2015 | Suleman et al. | |
| 2016/0004501 A1 | 1/2016 | Kar et al. | |
| 2016/0071517 A1 | 3/2016 | Beaver et al. | |
| 2016/0078087 A1 | 3/2016 | Wang et al. | |
| 2016/0173578 A1 | 6/2016 | Sharma et al. | |
| 2016/0188565 A1* | 6/2016 | Robichaud | G06F 16/3329 704/9 |
| 2016/0259775 A1 | 9/2016 | Gelfenbeyn et al. | |
| 2016/0379640 A1 | 12/2016 | Joshi et al. | |
| 2017/0046124 A1* | 2/2017 | Nostrant | G10L 15/16 |
| 2017/0177715 A1 | 6/2017 | Chang et al. | |

OTHER PUBLICATIONS

Dachis, Adam; "The Seven Best Things You Can Do With an Amazon Echo"; Life Hacker; Mar. 30, 2016.
"Chatbot Ana, Copa Airlines"; http://www.chatbots.org/virtual_agent/ana2/; Printed Jun. 8, 2016.
Office Action from USPTO dated Apr. 7, 2017 for related U.S. Appl. No. 15/241,376.
Final Office Action from USPTO dated Aug. 25, 2017 for related U.S. Appl. No. 15/241,376.
Notice of Allowance from USPTO dated Jan. 19, 2018 for related U.S. Appl. No. 15/241,376.
Office Action from USPTO dated Jul. 25, 2019 for related U.S. Appl. No. 15/954,271.
Notice of Allowance from USPTO dated Nov. 6, 2019 for related U.S. Appl. No. 15/954,271.

* cited by examiner

Conversation Training Page

686 — 1. Choose the intended action

688 — 2. Set your filters

690 — 3. Choose the response

692 — 4. Add questions people can ask

694 — 5. Send data to Server

696 — Fields

DIGITAL ASSISTANT AND ASSOCIATED METHODS FOR A TRANSPORTATION VEHICLE

CROSS-REFERENCE TO RELATED APPLICATION

This patent application is a divisional of U.S. patent application, Ser. No. 15/954,271, now U.S. Pat. No. 10,573, 299, filed on Apr. 16, 2018; which is a continuation-in-part (CIP) of U.S. application Ser. No. 15/241,376, now U.S. Pat. No. 9,972,312, filed on Aug. 19, 2016, entitled, "DIGITAL ASSISTANT AND ASSOCIATED METHODS FOR A TRANSPORATION VEHICLE", the disclosures of which are incorporated herein by references in their entireties.

TECHNICAL FIELD

The present disclosure relates to transportation vehicles in general and more particularly, to using a natural language digital assistant on transportation vehicles.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a particular passenger seat which can be utilized by a passenger, such as adjustable seats, adjustable environmental controls, adjustable lighting, telephony systems, video and/or audio entertainment systems, crew communication systems, and the like. For example, many commercial airplanes have individualized video and audio entertainment systems, often referred to as "in-flight entertainment" or "IFE" systems.

As one example of a passenger seat function, the entertainment systems for passenger carrier vehicles, such as commercial airlines, often have video displays installed at each passenger seat. For instance, video displays may be provided at each passenger seat, such as mounted at each of the seats of the passenger seats, and/or on cabin walls and/or deployable from an armrest for seats located at a bulkhead, i.e., in the first row of a section. Many of these systems allow each passenger to select from multiple video channels and/or audio channels, or even individually select and play videos from a library of videos. These video displays may also provide access to games, communication applications (e.g., telephone service, messaging, etc.), Internet browsing, and other computer applications. Sometimes such displays are referred to as smart monitors due to the ability to provide computer applications and process and store data internally.

To operate the seat functions, such as an individualized audio/video system, controls are provided on or near the passenger seat that allow the passenger to control the seat functions. The controls may be physical buttons, or on-screen interfaces displayed, for instance, on the video display of the entertainment system. For example, some commercial airplane entertainment systems have on-screen interfaces for controlling a reading light, activating a crew member call signal, as well as controlling the audio/video entertainment.

It has become quite commonplace for travelers to carry personal electronic devices (PEDs) having wireless communication capability, such as cellular phones, smart phones, tablet computers, laptop computers, and other portable electronic devices. This includes passengers and crew traveling on all types of transportation including the vehicles of common carriers, such as airplanes, passenger trains, buses, cruise ships, sightseeing vehicles (e.g., ships, boats, buses, cars, etc.). Many of these personal electronic devices have the capability to execute application software programs ("apps") to perform various functions, including controlling other devices and systems.

Conventional IFE systems lack the ability to provide passengers an efficient way to discover content. For example, searching for a movie currently requires a user to navigate to the movies page and then find the movie that they wish to watch. In addition, IFE systems often lack the ability for crew to efficiently find and execute control functions of the IFE system. Continuous efforts are being made to develop technology that can improve passenger experience and transportation vehicle provided customer service.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures:

FIGS. 6D-6E show screenshots of a neural network training tool, according to one aspect of the present disclosure.

DETAILED DESCRIPTION

Figure 1A:
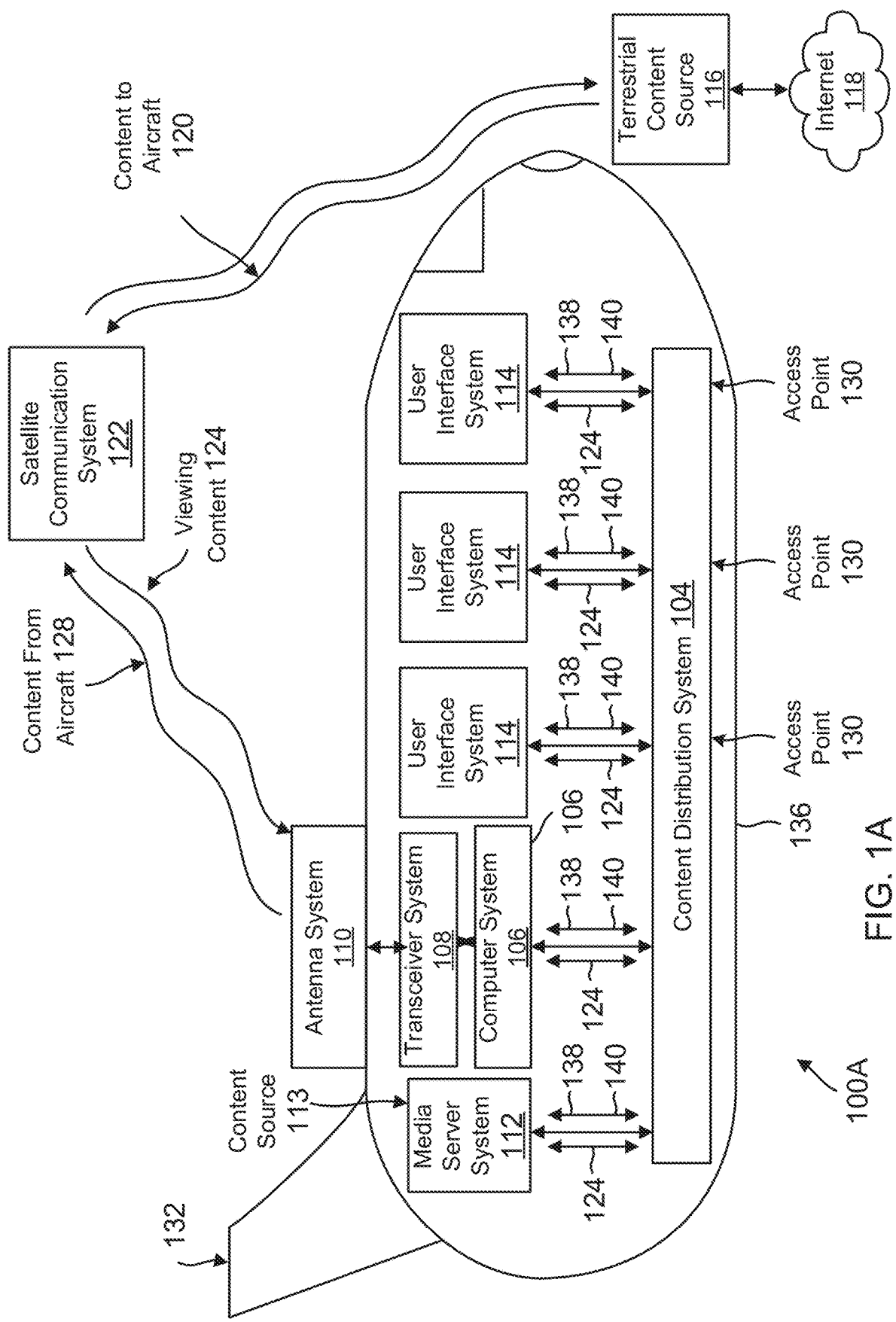
FIG. 1A shows an example of an operating environment for implementing the various aspects of the present disclosure on an aircraft.

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components are stored at non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

In one aspect, methods and systems are provided where an artificial intelligence BOT (referred to as a digital assistant) can interact with a user on a transportation vehicle, for example, an aircraft. The digital assistant provides information regarding content that may be available on the aircraft and/or processes an action request or a crew request, or provides help with a request. The digital assistant receives a user input that may be in text or voice form. If the input is voice, then a voice-to-text module translates the voice input to a text input.

The text input is then provided to a natural language parser. The parser tags the words in the input phrase with grammatical connotations that are sent to a trained natural language interpreter, which translates words and grammar to a machine readable input. The machine readable input may be in the form of a JSON (Java Script Object Notation) structure or any other format. The machine readable input is then provided to a machine language processor which associates the input to user requests.

The following are examples of some commands for using the digital assistant of the present disclosure: Play a Harry Potter movie. Are there any movies on this flight played by Brad Pitt? Play a rock playlist. Play a song by Ed Sheeran. Play Photograph by Ed Sheeran. I want a cup of water. How long do we still need to arrive to our destination? What is the current altitude? What is the current speed? How's the weather like at the destination? What's the weather like in Seattle? List all shopping items for perfume? Do you have any electronic watches in duty free? Turn on the reading light. Set the parental control to PG. Remind me to fill up my I-94 when we arrive. What is the capital of France?

In another aspect, methods and systems for a transportation vehicle are provided. For example, one method includes receiving a user input by a processor executable, digital assistant at or on a device on a transportation vehicle; determining by the digital assistant a relationship between words of the user input; using a trained dataset by the digital assistant to ascertain an intended action based on the user input; and providing a response by the digital assistant for the user input, where the response includes performing the intended action using another device on the transportation vehicle.

In yet another aspect, a method is provided, where the method includes storing a trained dataset for training a processor executable, digital assistant executed by a seat device of an aircraft, where the trained dataset associates an intended action with one or more words in a user request received by the seat device on the aircraft; converting the user request into text by the digital assistant, when the user request is a voice command; determining by the digital assistant a relationship between words in the user request; using the trained dataset by the digital assistant to ascertain the intended action; and providing a response by the digital assistant by performing the intended action, where the intended action involves using an inflight entertainment system on the aircraft.

In yet another aspect, methods and systems for a transportation vehicle are provided. For example, one method includes receiving a user input for a valid communication session by a processor executable, digital assistant at a device on a transportation vehicle; tagging by the digital assistant, the user input words with a grammatical connotation; generating an action context, a filter context and a response context by a neural network, based on the tagged user input; storing by the digital assistant, a key-value pair for a parameter of the filter context at a short term memory, based on an output from the neural network; updating by the digital assistant, the key-value pair at the short term memory after receiving a reply to a follow-up request and another output from the trained neural network; and providing a response to the reply by the digital assistant.

In another aspect, a method is provided. The method includes training a neural network for an action category on an aircraft associated with an intended user request by defining at least a filter parameter and a response context based on the filter parameter; generating by the neural network an action context based on the action category, a filter context and a response context for a tagged user input; using a short term memory configured as a least recently used memory for storing a key-value pair associated with the parameter of the filter context; generating an output by the neural network in response to a follow-up request from the user; updating the key-value pair at the short term memory based on the output from the neural network; and providing a response to the follow-up request.

Vehicle Information System:

FIG. 1A shows an example of a generic vehicle information system 100A (also referred to as system 100A) that can be configured for installation aboard an aircraft 132 for using a digital assistant, according to one aspect of the present disclosure. When installed on an aircraft, system 100A can comprise an aircraft passenger IFE system, such as the Series 2000, 3000, eFX, eX2, eXW, and/or any other in-flight entertainment system developed and provided by Panasonic Avionics Corporation (without derogation of any trademark rights of Panasonic Avionics Corporation) of Lake Forest, Calif., the assignee of this application.

System 100A comprises at least one content source 113 and one or more user (or passenger) interface systems (may also be referred to as a seat device/seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122.

System 100A can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interfaces 114 including a PED, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content. The user interface system 114 includes a hardware interface to connect to an access point 130 that provides a wired and/or a wireless connection for the user interface system. In at least one embodiment, the user interface system 114 comprises a software application that a user downloads and installs on a PED to receive and view content via an access point 130. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124 or for any other reason, payment information likewise can be entered via the input system. The input system can be provided in any conventional manner and typically includes a touch screen, a microphone for voice input, one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircrafts and seating arrangements and the adaptive aspects described herein are not limited to any specific seat arrangements or user interface types.

Figure 1B:
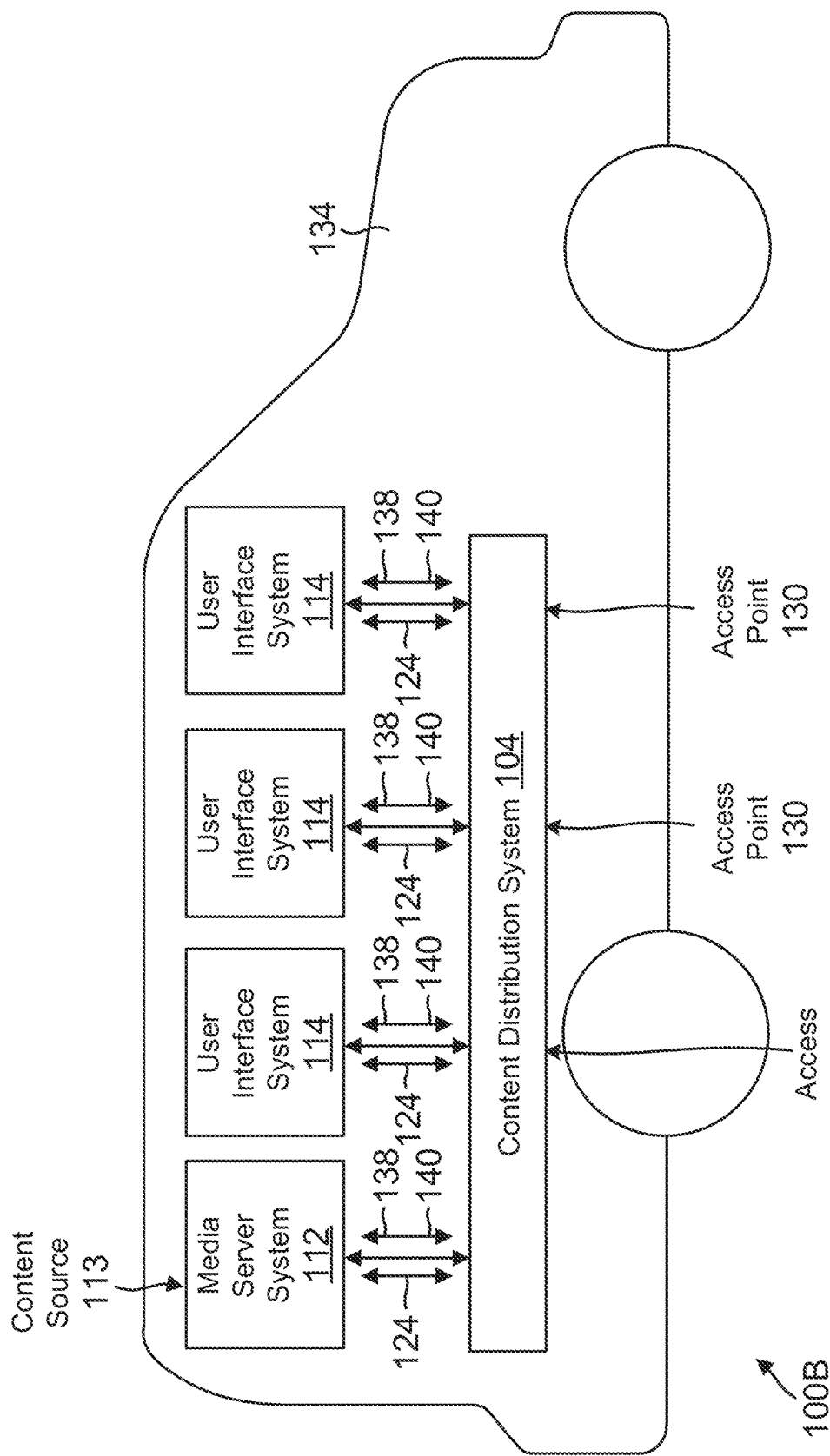
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
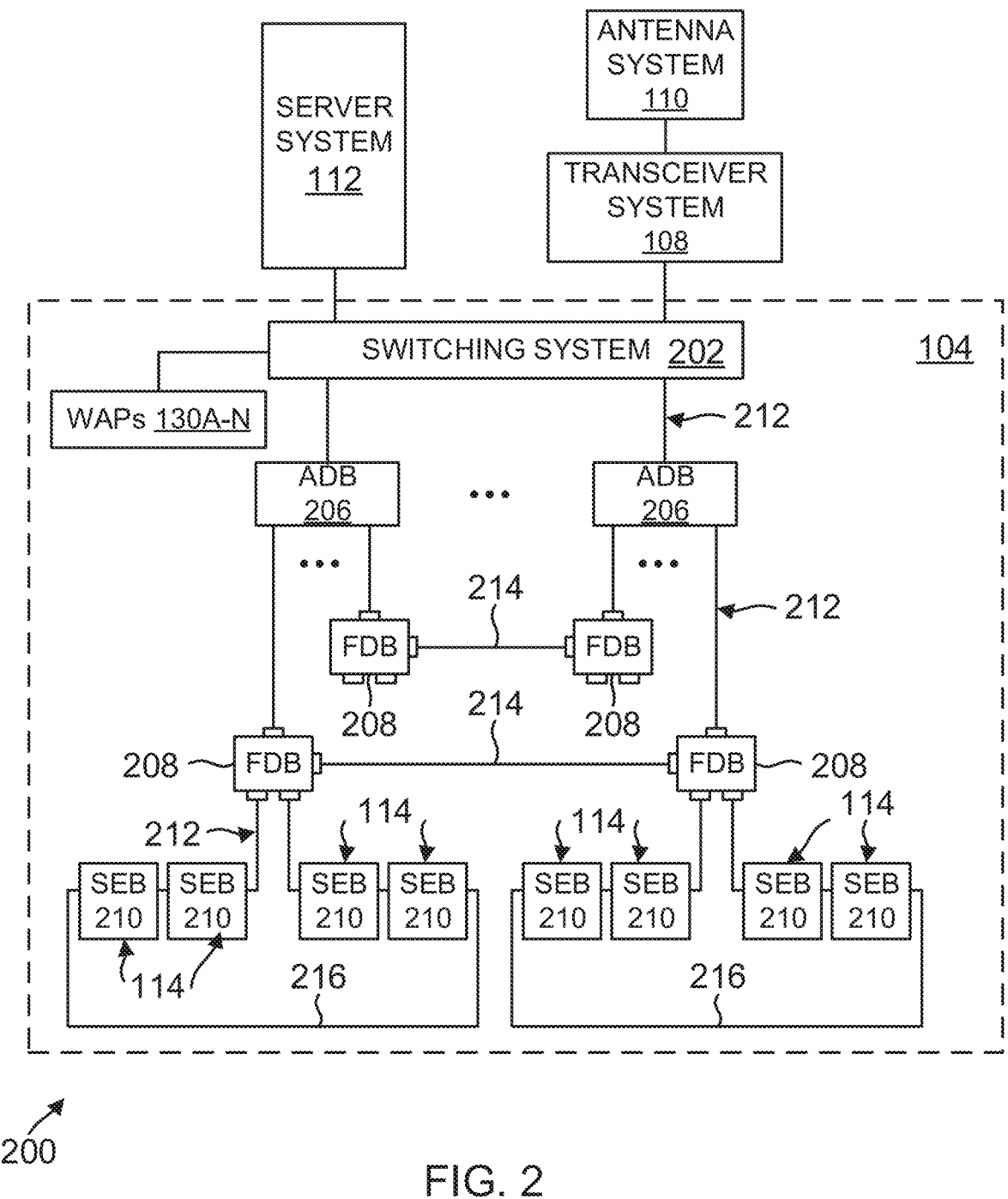
FIG. 2 shows an example of a content distribution system, used according to one aspect of the present disclosure.

Content Distribution System:

FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16.

Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212.

The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more wireless access points (WAPs) (130A to 130N) connected in communication with the switch system 202 for wireless distribution of content to user interface systems 114 including PEDs.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3A:
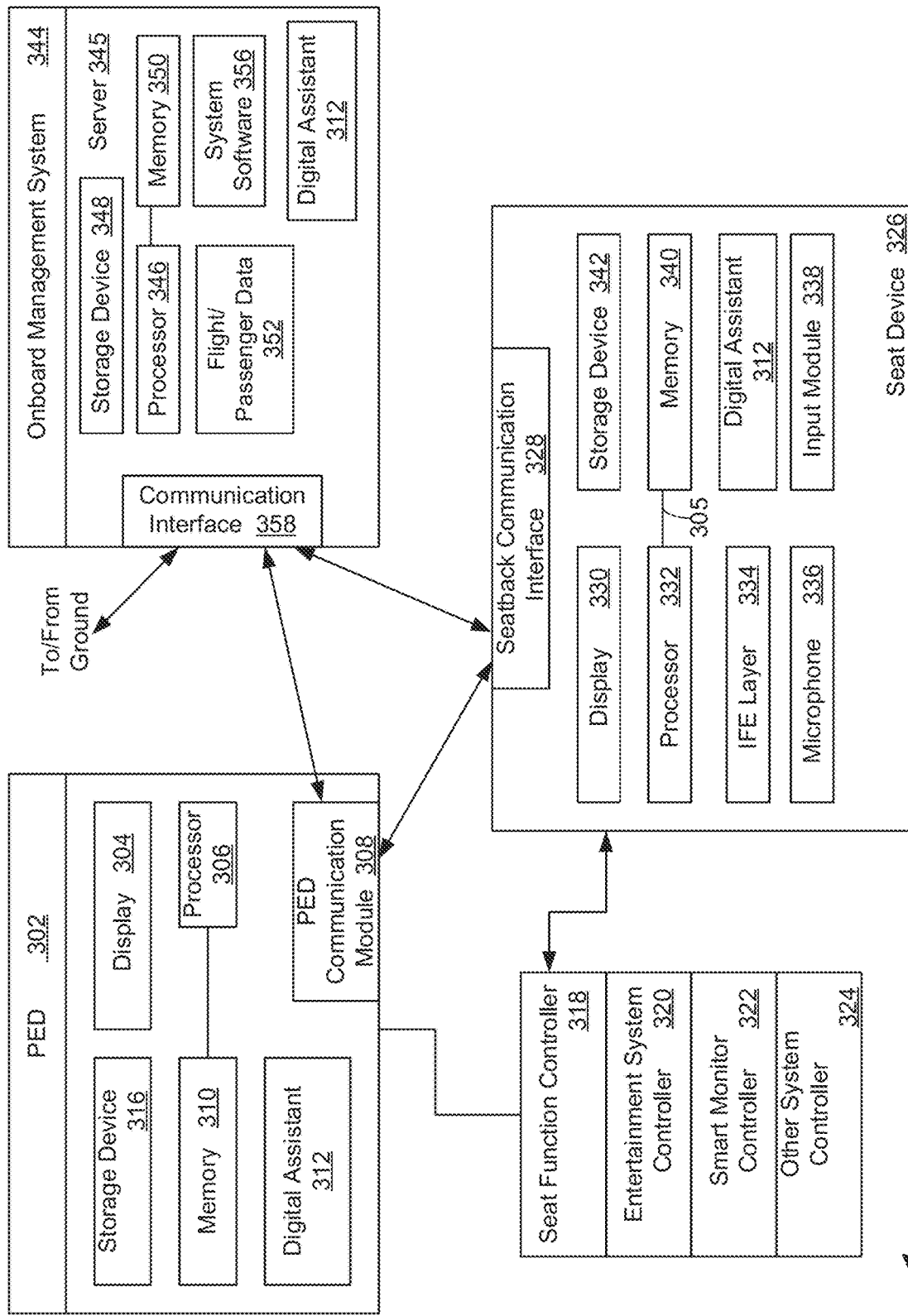
FIG. 3A shows an example of a system for using a digital assistant on a transportation vehicle, according to one aspect of the present disclosure.

System 300:

FIG. 3A shows an example of a system 300 with a digital assistant 312 that may be executed on a seat device 326 (may also be referred to as seatback device), an onboard management system 344, and/or a PED 302 that is paired with the seat device 326 and/or the onboard management system 344, in one aspect of the present disclosure. The onboard management system 344 may be similar to computer system 106 and/or server 112 described above with respect to FIGS. 1A/1B. The seat device 326 may be part of the user interface system 114 or interfaces with the user interface system 114 also described above with respect to FIGS. 1A/1B. It is noteworthy that the seat device 326 need not be mounted on the back of a seat and may be supported from other structures, such as a bulkhead, wall, arm of a seat, etc. The adaptive aspects of the present disclosure are not limited to any specific location or orientation of the seat device 326.

In one aspect, the seat device 326 includes a display device 330, a processor 332, a memory 340, a communication interface 328 and a local storage device 342 for storing content. The seat device 326 receives user input/requests via an input module 338. The input module 338 may be configured to use a local touch screen included with display 330, a local virtual keyboard, an external mouse, external keyboard or any other input device. The various adaptive aspects described herein are not limited to any specific input device.

The seat device 326 may also receive voice inputs/commands via a microphone 336. The voice commands are provided to the digital assistant 312 and processed, as described below in detail.

Processor 332 has access to memory 340 via an interconnect 305. Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The bus system 305 is an abstraction that represents any one or more separate physical buses and/or point-to-point connections, connected by appropriate bridges, adapters and/or controllers. The bus system 305, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

In one aspect, processor 336 executes an IFE layer 334 that provides in-flight entertainment and other options to users. The IFE layer 334 provides audio/video content as well as controls for accessing the content. The IFE layer 334 uses the communication interface 328 to interface with the PED 302 and/or onboard management system 344. The communication interface 328 includes logic and circuitry for interfacing with the onboard management system 344 and/or PED 302. In one aspect, the communication interface 328 may use a wireless and/or wired connection for such communication.

In one aspect, PED 302 may be a mobile phone, a notebook, a tablet, a laptop or any other similar device. PED 302 may include a processor 306 that has access to a memory 310 via an interconnect/bus for executing stored instructions. Processor 306 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. PEDs 302 typically include a microphone 309 for sensing sound and converting it to corresponding electrical signals for processing, storage, and/or output, e.g., voice input for telephone communication, receiving voice commands for operation of the PED, recording audio information, etc.

The PED 302 includes a storage device 316 that may be, or may include any storage medium for storing data in a non-volatile manner, such as one or more magnetic or optical based disks, flash memory, or solid-state drive. The storage device 316 maybe used to store content displayed on a display 304 of PED 302. In one aspect, display 304 may include a touch screen for receiving input commands as well as a microphone (not shown) for receiving voice input.

The storage device 316 may store the digital assistant 312 that may be executed out of memory 310. In one aspect, the digital assistant 312 may be executed as a downloadable application that may be stored on a storage device of an application store ("App Store") (not shown) such as that operated by Apple, Inc. under the trademark ITUNES, the application store operated by Google, Inc. under the trademark GOOGLE PLAY, or the application store operated by Microsoft Corporation under the trademark WINDOWS STORE. Alternatively, the app store may be a website server for a website operated by a provider of the on-board management system 344 such as the manufacturer or a carrier operating the vehicle (e.g., a commercial airline, train operator, cruise line, bus line, etc.).

In one aspect, a seat function controller 318 provides a controller 320 to control the entertainment system for accessing audio/video content and a controller 322 for controlling a smart monitor (that is part of or interfaces with the seat device 326). Other system controller 324 may include a controller for controlling the lighting system for controlling lights for a passenger seat, a controller for an attendant call system to call an attendant, a controller for telephone system, a controller for food service to order food, a controller for making seat adjustments and others. The various aspects disclosed herein are not limited to any particular type of seat function. In one aspect, based on a user request, the digital assistant 312 provides a command to the seat function controller 318 for performing a requested action, for example, turn-on or turn-off light, calling an attendant, ordering food and other functions.

In one aspect, the seat function controller 318 communicates with the PED communication module 308 as well as with the seat device 326. In one aspect, PED communication module 308 may include one or more interfaces to communicate with different devices, including Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module may have different interface, cards, logic and circuitry to comply with the different communication protocols/standards.

In one aspect, the onboard management system 344 includes a server 345 (similar to media server 112 and/or computer system 106). The server 345 includes a processor 346 that has access to a memory 350 via a bus system, similar to bus 305 described above in detail. Processor 346 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Processor 346 has access to a storage device 348 that may be used to store data, applications and program files. In one aspect, the onboard management system 344 maintains flight and passenger data 352, for example, arrival time, altitude and other information as well as passenger data that identifies each passenger for a flight, a seat assigned to a passenger and any other information that can uniquely identify the passenger. Flight data may be retrieved and presented to a user by the digital assistant 312, in response to a user request.

System software 356 of the onboard management system 344 is executed by the processor 346 to control the overall operation of the server 345. In one aspect, the server system 345 may also execute the digital assistant 312 or a portion thereof.

In one aspect, server 345 communicates with PED 302 and/or seat device 326 via a communication interface 358. The communication interface 358 may also be used to receive information from the ground. The communication interface 358 includes one or more interface for a wired and/or wireless connection, as described above with respect to FIGS. 1A/1B and 2.

Figure 3B:
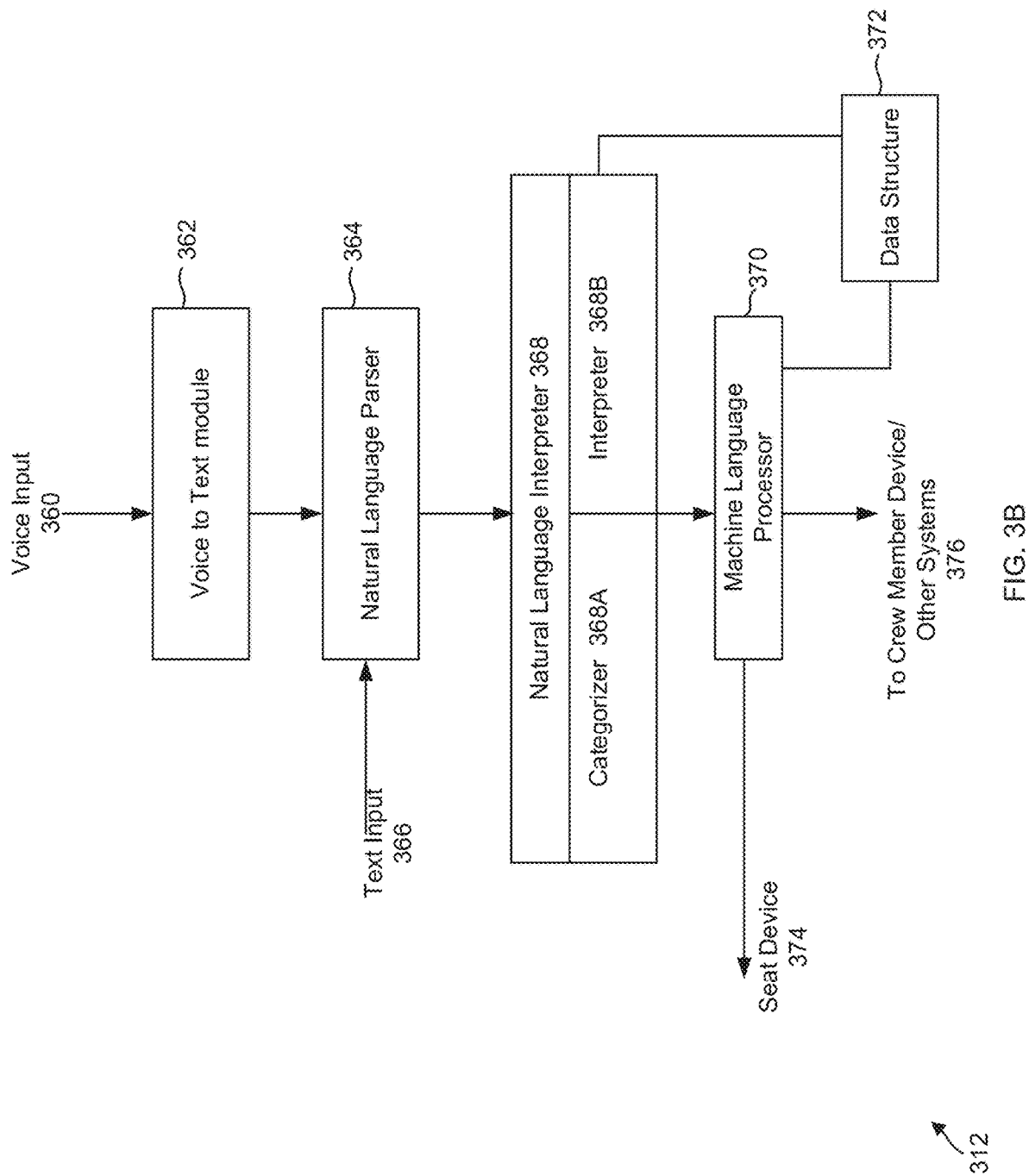
FIG. 3B shows a block diagram of the digital assistant, according to one aspect of the present disclosure.

FIG. 3B shows a block diagram of the digital assistant 312, in one aspect of the present disclosure. In one aspect, the digital assistant 312 is an artificial intelligence BOT that can interact with a user on a transportation vehicle, for example, an aircraft. The digital assistant 312 provides information regarding content that may be available on the aircraft and/or processes an action request or a crew request or provides help therewith, as described below in detail.

The digital assistant 312 receives a voice input 360 or a text input 366. The following provides examples of some of user requests/input: Play a Harry Potter movie. Are there any movies on this flight played by Brad Pitt? Play a rock playlist. Play a song by Ed Sheeran. Play Photograph by Ed Sheeran. I want a cup of water. How long until we arrive at our destination? What is the current altitude? What is the current speed? How's the weather like at the destination? What's the weather like in Seattle? List all shopping items for perfume. Do you have any electronic watches in duty free? Turn on the reading light. Set the parental control to PG. Remind me to fill in my I-94 when we arrive. What is the capital of France? Remind me to send a text for pickup when we arrive.

The voice input is provided to a voice to text module 362 (may be referred to as module 362) that converts the voice input to text. The converted text or the text input 366 is then provided to a natural language parser 364 (may also be referred to as parser 364).

Parser 364 tags the words in the input phrase with grammatical connotations. Parser 364 logic transforms sentences into words with grammatical constructs and provides a better understanding of words and their relationships to others words in a given sentence/input. Words relationship may be nested or parallel. Nested relationships include nested words that define another or previous word as described below in detail.

The output from parser 364 is provided to a trained Natural Language Interpreter 368 (may also be referred to as module 368) that includes a categorizer 368A and an interpreter 368B. Module 368 translates words and grammar to a machine readable input that may be in the form of a JSON (Java Script Object Notation) structure.

Module 368 receives a breakdown of the sentence and grammar notations from parser 364. Module 368 ascertains the logic of the tree hierarchy, known dependent words, actions, nouns, and others. The categorizer 368A attempts to categorize the raw sentence based on a trained dataset stored in a data structure 372 or other form, e.g., database, table, etc. The training is supervised to ensure appropriate and non-offensive responses by the digital assistant, as opposed to unsupervised training that can result in unpredictable and/or possibly offensive responses.

The trained dataset may be for different categories, for example, a flight data category that includes metadata identifying various actions around flight data, an entertainment data category for various entertainment related actions, for example, movies, audio, playing a movie, pausing a movie, controls associated with moves), and a shopping category for storing metadata associated with shopping related actions, for example, buying, returning, listing. The trained dataset may also include a crew instructions category, a security category associated with aircraft security and others, such as a help category listing and explaining available instructions. It is noteworthy that the trained dataset may continue to evolve and change as the digital assistant 312 becomes more reliable and accurate over time. For example, there may be use cases involving foreign languages that the trained dataset does not satisfactorily address. To address these situations, the trained dataset may include onboard training and include modifications and additions based on feedback from end users to further improve the quality of responses to requests and instructions.

The interpreter 368B of module 368 starts evaluating a root item and moves deeper through a constituent tree to provide a more detailed relationship to a parent word. The interpreter 368B provides an action or information request to a machine language processor 370 (may be referred to as Processor 370). Processor 370 then makes API (Application Programming Interface) calls to the appropriate devices, for example, crew member devices 376 or a seat device 374 (similar to 326 described above with respect to FIG. 3A to perform a requested action.

Figure 4A:
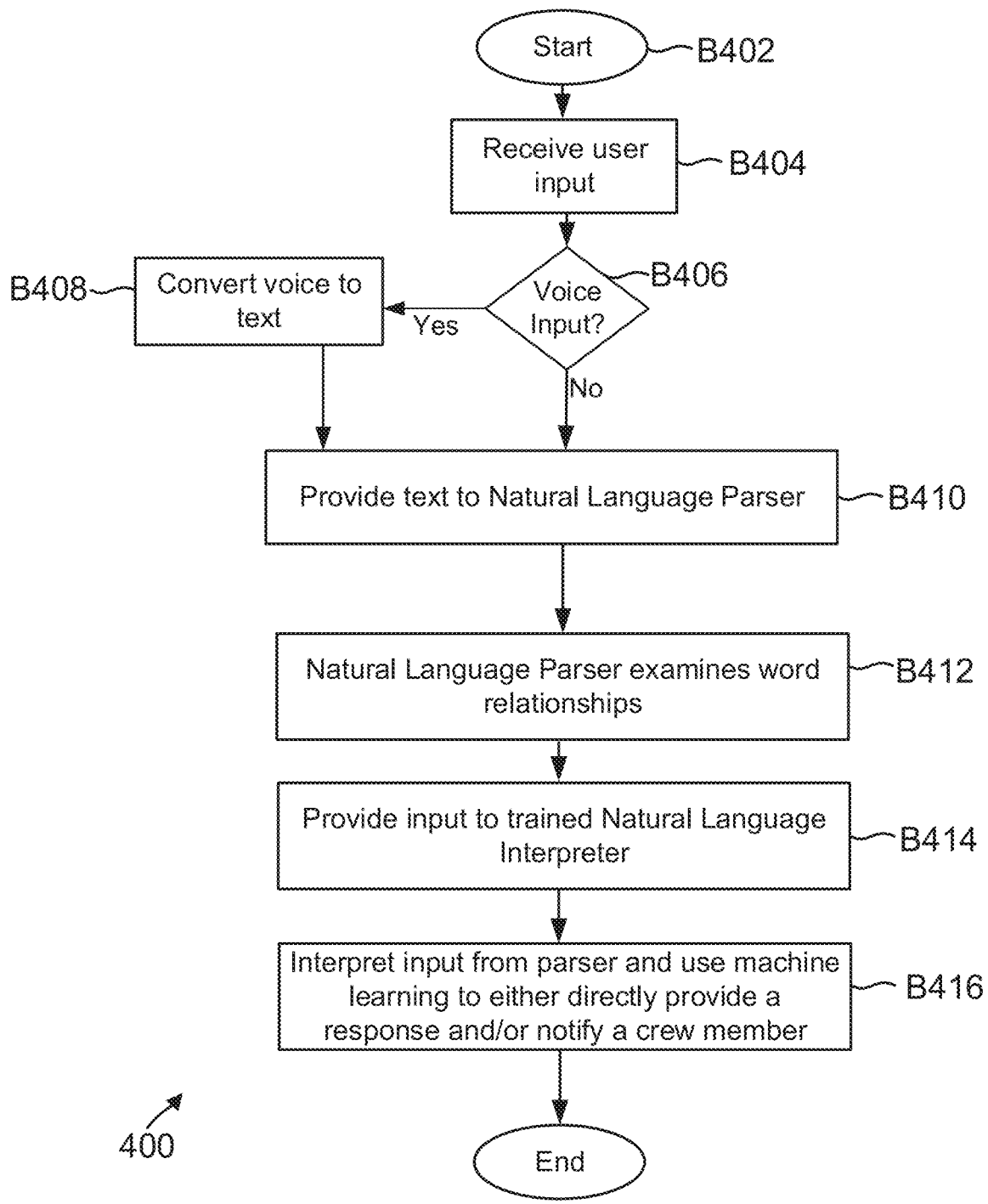
FIGS. 4A-4B show process flow diagrams for using the digital assistant, according to one aspect of the present disclosure.

Process Flow:

FIG. 4A shows a process flow 400 for using the digital assistant 312, according to one aspect of the present disclosure. The process begins in block B402, when the digital assistant 312 is installed on a seat device 326, server 345 and/or PED 302. The adaptive aspects described herein are not limited to where the various components of digital assistant 312 are executed. For example, module 362 may be executed on the seat device 326, while the parser 364, module 368 and processor 370 may be executed on other devices.

Once the digital assistant 312 is initialized, a user input is received in block B404. The process determines if the input is a voice request in block B406. In one aspect, the voice request is received by the microphone 309 or 336 (see FIG. 3A). When the input is a voice input, then it is converted into text in block B408 by module 362 and provided to parser 364 in block B410. When the input is a text input received via input module 338, then the text is provided to parser 364.

In block B410, parser 364 examines the text and transforms sentences into words with grammatical constructs, which provides a better understanding of words and their relationships to others words in a given sentence/input. Word relationships may be nested or parallel. For example, nested relationships include nested words that define another or previous word. For example, in the phrase 'Play a movie', the term movie is nested relative to the word play. On the other hand, sibling words in the phrase 'Play a movie or a song', are movie and song. This means that song does not define the word movie, it is instead taking a new path with an and/or relationship to the word movie. Parser 362 takes a phrase/sentence and outputs a machine readable construct of the sentence, for example:

An input sentence 'play a movie that Brad Pitt acted in' may be represented as a following tree.

```
(S (VP Play
    (NP (NP a movie)
        (SBAR (WHNP
            that)
            (S (NP Brad
                Pitt) (VP
                acted
                (PP in)))))))
```

An output from parser 364 may be:

```
{
"raw" : "Play a movie that Brad Pitt acted in",
"items" : [
    {
            "word" :
            "play",
        "type" : "VP",
        "subwords" : "word" : "movie",
            [   "type" : "NP",
                {   "subwords" :
                    [
                        {
```

-continued

```
                              "word" : "BradPitt",
                              "type" : "NP",
                              "subwords" :
                                  [
                                      {
                                          "word": "acted",
                                          "type": "VP",
                                          "subwords" : []
                                      }
                                  ]
                              }
                          ]
                      }
                  ]
              }
          ]
      }
  ]
}
```

As shown above, dependent words that provide more details of the previous one have a nested relationship.

Information may be extracted based on conditional random fields (CRF) or hidden Markov Models (HMM) trained sets that allows the appropriate words from a sentence to be identified and processed. The trained sets include sentences, the words thereof, each word's part-of-speech, and an associated information tag. The intent of the person that typed or spoke the sentence can be parsed based on training sets for each intent for information extraction.
Alternatively, the intent can be parsed by reusing some other common trained set.

An example is as follows:

| remind | VB | O |
| me | PRP | O |
| to | TO | O |
| get | VB | B-Subj |
| dinner | NN | I-Subj |
| on | IN | O |
| Saturday | NN | B-Day |
| at | IN | O |
| 3 | CD | B-Time |

The following information can be extracted from the sentence "remind me to get dinner on Saturday at 3":
'Get Dinner' is the reminder subject.
'Saturday' is the day. In this case the system will choose the closest relative Saturday.
'3' is the time. AM and PM can be decided by the system based on the closest, AM or PM, to the current time. Of course some training will include AM and PM. An example is as follows to give more details on when. Missing fields of day and time will be generated based on relative time.

| remind | VB | O |
| me | PRP | O |
| to | TO | O |
| get | VB | B-Subj |
| dinner | NN | I-Subj |
| on | IN | O |
| Saturday | NN | B-Day |
| at | IN | O |
| 3 | CD | B-Time |
| PM | NNP | I-Time |

Returning to FIG. 4B, in block B414 an output from parser 364 is provided to module 368 that interprets the input and uses machine learning to provide instructions to processor 370. Module 368 receives a machine readable breakdown of a sentence and grammar notations from parser 364. Module 368 ascertains the logic of the tree hierarchy, known dependent words, actions, nouns, and others.

The categorizer 368A attempts to categorize the raw sentence based on a trained dataset stored in data structure 372 that provides a certain degree of accuracy, which is used to calculate the confidence level of a response. The interpreter 368B of module 368 starts evaluating a root item and moves deeper through the constituent tree to provide a more detailed relationship to a parent word.

In the example provided above, the interpreter 368B starts by evaluating the first item and checks its type. For example, if the type is a verb, then it knows an action is involved. The interpreter 368B next evaluates the word field and passes it through a word stemmer to convert words into its basic part before being processed. This covers instances, for example, where 'play', for example, can be written as plays, played, and etc. Then it will use that stemmed word to filter on what is expected next. The interpreter 368B then evaluates subitems to obtain more details regarding a current item. As an example, the interpreter 368B may use a machine learning algorithm called 'Decision Tree' and 'Random Forest', to provide a more accurate representation of an intended action. Even though the decision tree can be formulated automatically based on the training set, an example of what the tree may look like is shown in FIG. 4B and described below in detail.

The processor 370 then prepares a response to the appropriate device. The response may be to interact with the passenger service system, for example, activating a reading light, submitting a request to the crew, for example, requesting a drink or setting a reminder to prepare custom paperwork prior to arrival.

Figure 4B:
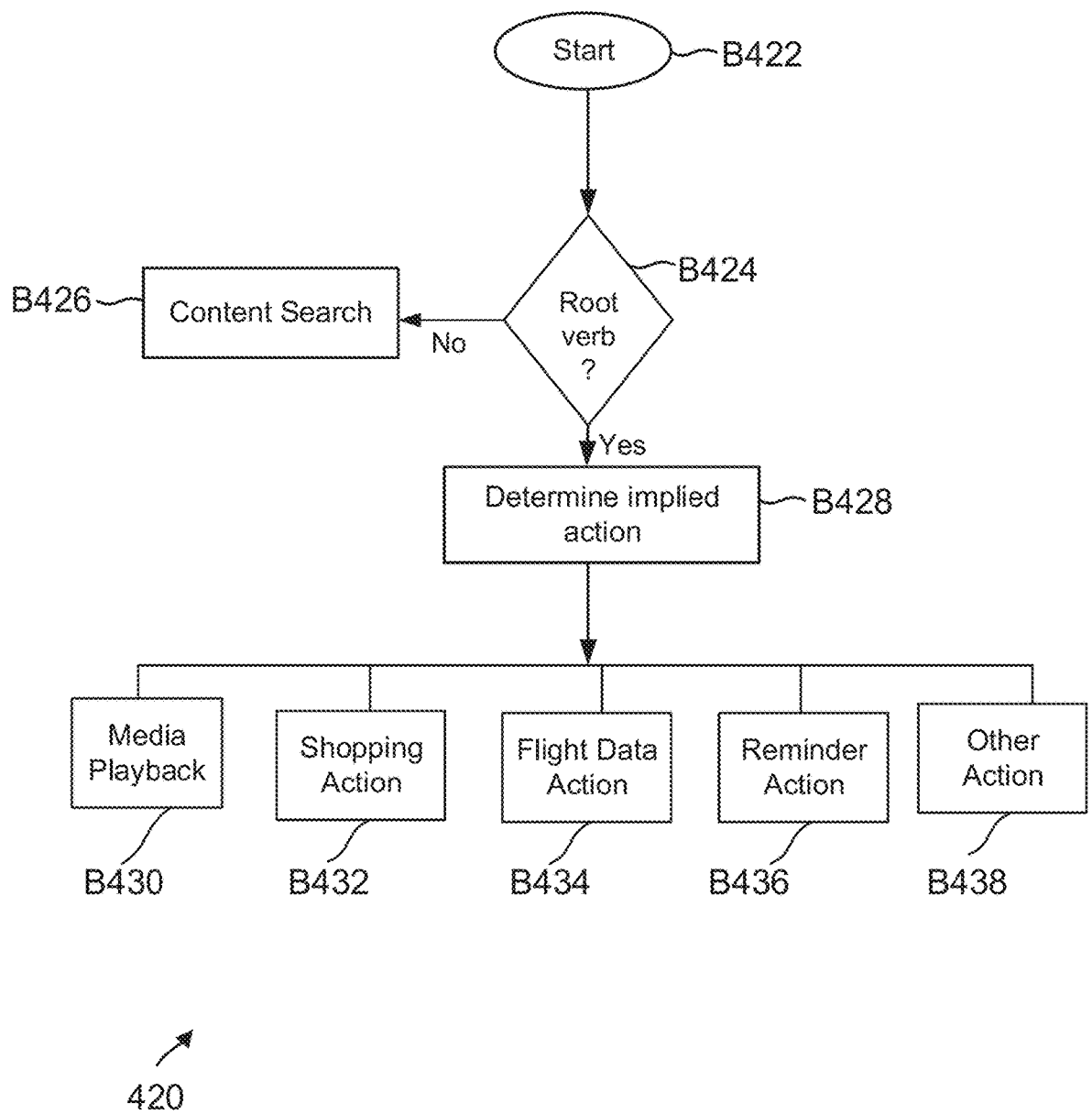

FIG. 4B shows an example 420 of using a decision tree, according to one aspect of the present disclosure. In block B424, the module 368 determines if there is a root verb. If not, the digital assistant performs a content search in block B426.

If there is a verb, then an implied action is determined in block B428. The implied action may be for a media playback in block B430, if the verb is in the media playback list, for example, "play", "list" and others.

The implied action may involve shopping, as shown in block B432. This again will depend if the verb is in the shopping category, for example, "buy", "list" and others.

The implied action may involve flight data, as shown in block B434. This will depend if the verb belongs to the flight data verb list, for example, "show" and others.

The implied action may be a reminder action, as shown in block B436, if the verb is in the reminder verb list, for example, "remind", "set" and others.

The other action, shown in block B438 is developed as the system continues to machine learn and evolve.

As shown above, the decision tree may change because some verbs can exist in multiple lists with a different intent based on the noun or the subject in the sentence. For instance the word 'list', may exist in media playback action, shopping, and flight data verb lists. The noun such as movie can further describe an intended list action. So based on the entropy and information gain variables, the decision tree may transform to improve the efficiency of the interpretation where a list can become a parent node for certain action categories. Once a leaf node is reached, the digital assistant 312 knows the action that is required based on the input.

In one aspect, the present disclosure relates to the flight entertainment applications for handling customer and/or crew requests using a natural language parser and interpreter. The foregoing methods may be used to accept passenger or crew member requests on board of a flight system through the use of natural language written or typed on an inflight system or on a personal electronic device.

In one aspect, a user can make requests for information available on a flight or an action via a natural human voice or text mechanism. The systems and methods described herein enable users to make requests for information such as arrival time or information regarding a movie listing on the flight, or an action such as play a movie or request a cup of water and others. The various aspects described herein improve passenger experience by providing a tool that will answer any questions and/or assist in fulling requests without having to search through different types of services.

Figure 5:
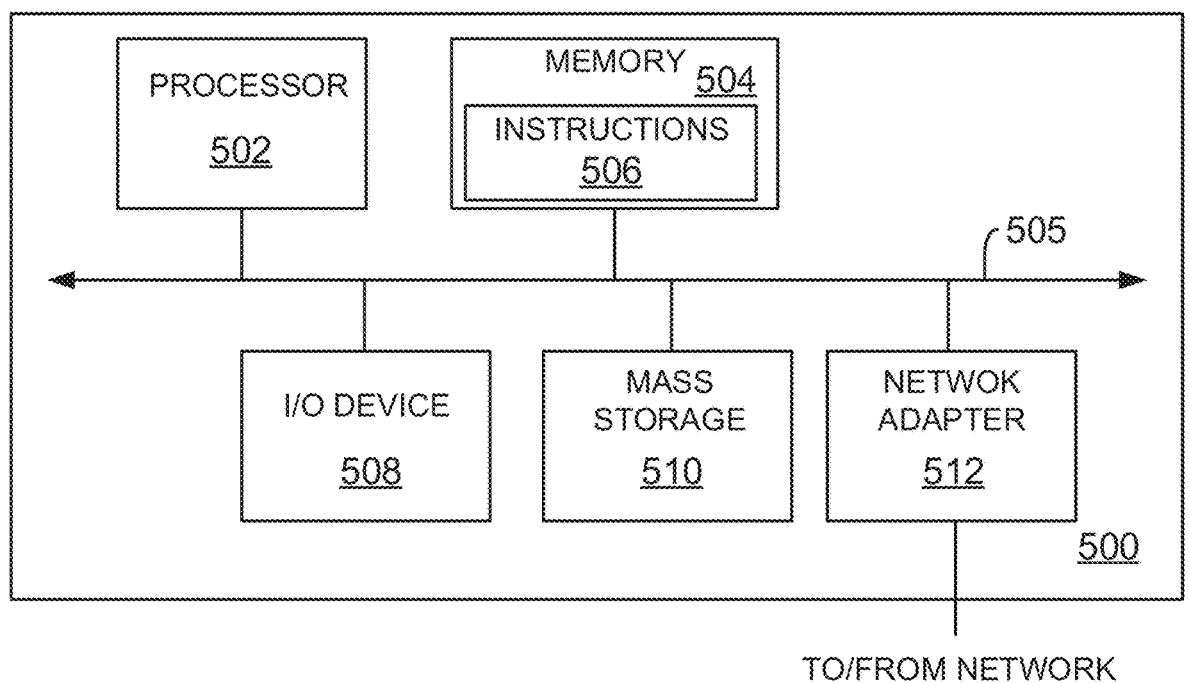
FIG. 5 shows a block diagram of a computing system, used according to one aspect of the present disclosure.

Processing System:

FIG. 5 is a high-level block diagram showing an example of the architecture of a processing system 500 that may be used according to one aspect. The processing system 500 can represent media server 112, computing system 106, WAP 130, onboard management system 344, seat device 326 or any user device (PED 302) that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the digital assistant 312 and/or the process steps of FIGS. 4A-4B described above.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

System 600:

FIG. 6 shows another example of a digital assistant 600 (may also be referred to as system 600) using an artificial neural network (may be referred to as "ANN" or neural network) 604 for responding to user requests, according to another aspect of the present disclosure. System 600 may be used to interact with in-flight entertainment applications for handling customer and/or crew requests, for shopping related actions, and security related actions. System 600 enables a user to make requests for information/action using voice and/or text.

In one aspect, system 600 uses a short-term memory 612 configured to operate as a least recently used (LRU) device to respond to user follow-up questions after receiving an initial query from the user. The short term memory 612 enables a controller 606 of system 600 to emulate a human conversation by keeping track of previous replies to user requests, as described below.

In one aspect, system 600 includes the voice to text module 362 that receives a voice input (or user query/response) 360 and converts it into text. The text is then provided to parser 364 that has been described above in detail. When a text input 366 is received, the text input is provided directly to parser 364. It is noteworthy that although the voice to text module 362 is shown as a separate component, it may be integrated with a controller 606 of system 600.

Parser 364 examines the text and transforms sentences into words with grammatical constructs, which provides a better understanding of words and their relationships to others words in a given sentence/input. Parser 364 generates a tagged sentence (referred to as "part of speech tags" or "POS_tags") based on the context of the user input 360. Context in this aspect indicates an action category, for example, media related actions, shopping actions, flight data actions, reminder actions or any other type of action that the neural network 604 is trained to handle, as described below in detail. The various adaptive aspects of the present disclosure are not limited to any specific action category or context. The term context and category are used interchangeably with respect to taking any action in response to a user request.

The tags from parser 364 are provided to a feature extractor module (may be referred to as "feature extractor") 602 and the neural network 604. The feature extractor 602 extracts relevant information from the tagged sentence and provides it to the controller 606.

In one aspect, the short term memory 612 stores a filter parameter to value map 614A/614N and 616A/616N for each user session as key-value pairs. The filter parameter-value maps are based on filter context parameters and a value for each parameter. In one aspect, the short term memory 612 is configured to operate as a LRU type memory, where recent key-value pairs are retained for each user session/conversation, described below in detail.

The tagged input with any previous output contexts are provided to the neural network 604 for assessment. When a request is received for the first time, then there may be no previous context. The neural network 604 provides an action context, a filter context and at least a response context. The action context identifies a type of action that may be needed for a request for an action category including media related, shopping, flight data, reminder or any other action category, as described below in detail. The filter context includes filter parameters that are applied to the action context. The response context provides information to extract from the action context and then execute an action in response to a request.

An output based on an assessment of the neural network 604 is provided to the controller 606 that includes a state machine 608 and an action manager 610 that is used for processing the neural network 604 output.

The controller 606 maintains one or more data structures to store an action context 618, a filter context 620 and a response context 622 for each user session. The action context 618 is associated with an application programming interface (API) 624. The filter context 620 provides a query parameter 626 for API 624. A response 644 to a request is generated using the response context 622.

The controller 606 uses the output from the neural network 604 to find an action context for a user communication session. If the action context is missing, the controller 606 notifies the user that it did not understand the request. If an action context is found from the action context data structure 618, the controller 606 checks whether a previous action context matches the new one. If there is no match, then an entry in the short term memory 612 for the user session is cleared and the state machine 608 performs a context switch, for example, from a media search action category to a shopping action category.

The controller 606 verifies and handles the response context from the output of the neural network 604. If there is no response context, the controller 606 notifies the user that it did not understand the request.

The controller 606 also receives filter parameters from the neural network 606 output. The controller 606 checks whether filter parameter values are stored at the short term memory 612. For filter parameters that do not have an associated value, the controller 606 adds the filter parameters to a pending input queue for asking follow up questions. For each item in the pending input queue, the controller 606 requests the user to provide a response. The user response along with the filter parameters is again provided to the neural network 606 for processing.

The controller 606 determines if the user has cancelled the request. If the request is not cancelled, the output of the neural network 605 for the follow-up is sent to the parser 364 for tagging and to the feature extractor 602 to extract relevant information.

The controller 606 also checks whether the value for the user query was answered. If not, it asks the question again. If it has been answered, it removes the filter parameters from the pending queue and then loops back to check whether there are other items in the pending queue. Thereafter, the action manager 610 makes a request to an entity (for example, the onboard management system 344, a crew member PED, the seat function controller 318 or any other device) based on the action context and the filter parameters. The action manager 610 uses the response context to know what information to extract. The natural language generator 646 then populates a sentence with the requested information and provides a response to the user.

In one aspect, the controller 606 maintains a data structure (may be referred to as a user session data structure) 627 to track communication with each user PED. Each communication session is uniquely identified by an identifier 628. A user query 630 is stored in a memory device accessible to the controller 606 and may be different from the short term memory 612. The tags from the parser 364 are stored as 632, while the feature tags from the feature extractor 602 are stored as 634. A session state 636 is maintained by the state machine 608 indicating if a session is new, the session requires a follow-up or is canceled. The filter parameters for a current request 638 are maintained as 640, while the response context is maintained as 640. The response that is sent to the user device for a communication session 642 is also stored. An example of a user session data structure 627 is as follows. The controller 606 is referred to below as "Genie".

Figure 6A:
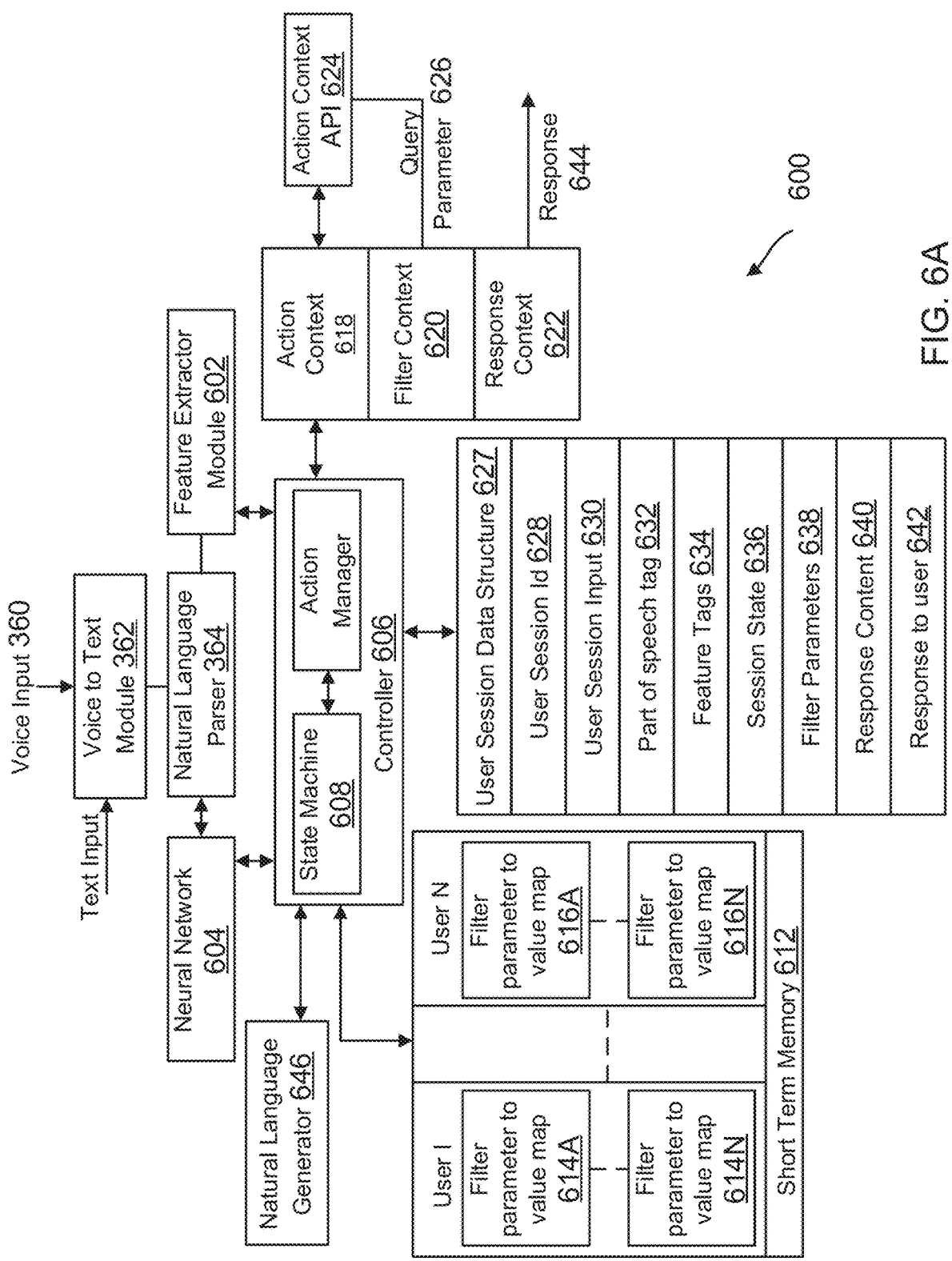
FIG. 6A shows an example of another system that uses a trained, neural network, according to one aspect of the present disclosure.

```
typedef struct __GenieSession
{
        /** The session id. */
        std::string sessionId [628, Figure 6A];
        /** The query line. [User Input 360] */
        std::string              line;
        /** The part-of-speech tagged line [from parser 364].
*/
        std::string              pos_tagged_line;
        /** The entity tag values. */
        JSON::Value              entity_tags;
        /** Holds the state of the session [636, Figure 6A].
Current possible states are new, follow-up, cancel. */
        GenieSessionState state;
        /** last status */
        int lastStatus;
        /** Holds the saved values of previous and current input
parameter context. */
        Short term memory 612;
    /** The last request action context */
    std::string actionContext;
        /**
        * Holds the filter parameters for a current request.
           * This includes the filter context determined by
           neural network 604 and any missing required filter
           parameters
        */
        std::vector<std::string> filterContexts;
    /** The response contexts */
    std::vector<std::string> responseContexts;
        /** The last artificial neural network (ANN) 604
context output */
        std::vector<std::string> previousANNOutputContexts;
        /** The current ANN context output */
        std::vector<std::string> currentANNOutputContexts;
            /** holds the filter parameters that requires a
follow up with the user. */
        std::queue<std::string> followUpFilterContextQueue;
```

-continued

```
        /** Store the final response. This is the response
returned to user. */
            JSON::Value finalResponse;
        /** The code of the natural language to be used for the
responses. */
            std::string languageCode;
            /**
        * This variable is populated during a "make request
state" and used in the handle
        * response state. This holds the response context
variables mapping to values.
        */
                std::vector<std::unordered_map<std::string,
            std::string>> responseOutputValues;
    ActionManager (610, Figure 6A)::ResponseType
responseType;
            /**
        * This is used to determine if there's a need to
specify filter context
        * values used for the query to user.
        */
                std::unordered_map<std::string, std::string>
previousFiltersValues;
        bool isFilterContextChanged;
                            }
    End GenieSession;
```

JSON as used above is an abbreviation for JavaScript Object Notation, and is a readable format for structuring data. The two primary parts that make up JSON objects are keys and values that together make a key/value pair. A key is a string enclosed in quotation marks and the value can be a string, number, Boolean expression, array, or object. A key value pair follows a specific syntax, with the key followed by a colon and a value. Key/value pairs are comma separated. It is noteworthy that JSON is simply illustrated as an example and the adaptive aspects are not limited to any specific data structure, object format or computer language.

In one aspect, controller 606 is scalable for different actions it can take for different action categories/contexts. This is implemented by defining an action manger class that registers implementation of a template function. The template function describes how action context requests are made, how filter context parameters are passed, as well as how to extract information from a response using the response context. The response from the template function includes what needs to be stored in the short term memory 612, as well as what may be needed to return for a specific request. This enables system 600 to be flexible to easily add different action contexts, filter contexts for training of the neural network 604 and the feature extractor 602, respectively, and then integrate the training to the controller 606 with minimal effort and experimentation.

An example of the template function is provided as:

```
    typedef Status (*ActionHandler) (
    const std::string                    &languageCode,
    const std::unordered_map<std::string,std::string>
                                         &filterContexts,
    const std::vector<std::string>       &responseContexts,
    std::vector<std::unordered_map<std::string,
    std::string>>                        &outputValues,
    std::unordered_map<std::string,
    std::vector<std::string>>            &storableValues,
    ResponseType                         &responseType
)
```

In one aspect, the short term memory 612 of system 600 enables a conversation between a human and the IFE system to appear more realistic, i.e., human like. The short term memory 612 may be configured as a LRU memory, where filter parameter to value entries are moved up in priority as they are used to avoid being removed. Entries from the short term memory 612 are removed when new items are added if the memory capacity of short term memory 612 reaches a threshold limit. The threshold limit may be configurable based on memory size, memory type and operating environment.

It is noteworthy that the various components of system 600 (i.e. digital assistant 600) may be implemented on one computing device or distributed across multiple computing device. For example, similar to the digital assistant 312 described above in detail, system 600 may be implemented as a downloadable application executed by PED 302. In another aspect, system 600 may be executed by the seat device 326 that is securely paired with the PED 302. In yet another aspect, system 600 may be executed by the onboard management system 344. In another aspect, the various components of system 600 are distributed across a PED 302, seat device 326 and the onboard management system 344, described above with respect to FIG. 3A. The adaptive aspects described herein are not limited to any specific device executing system 600.

Figure 6B:
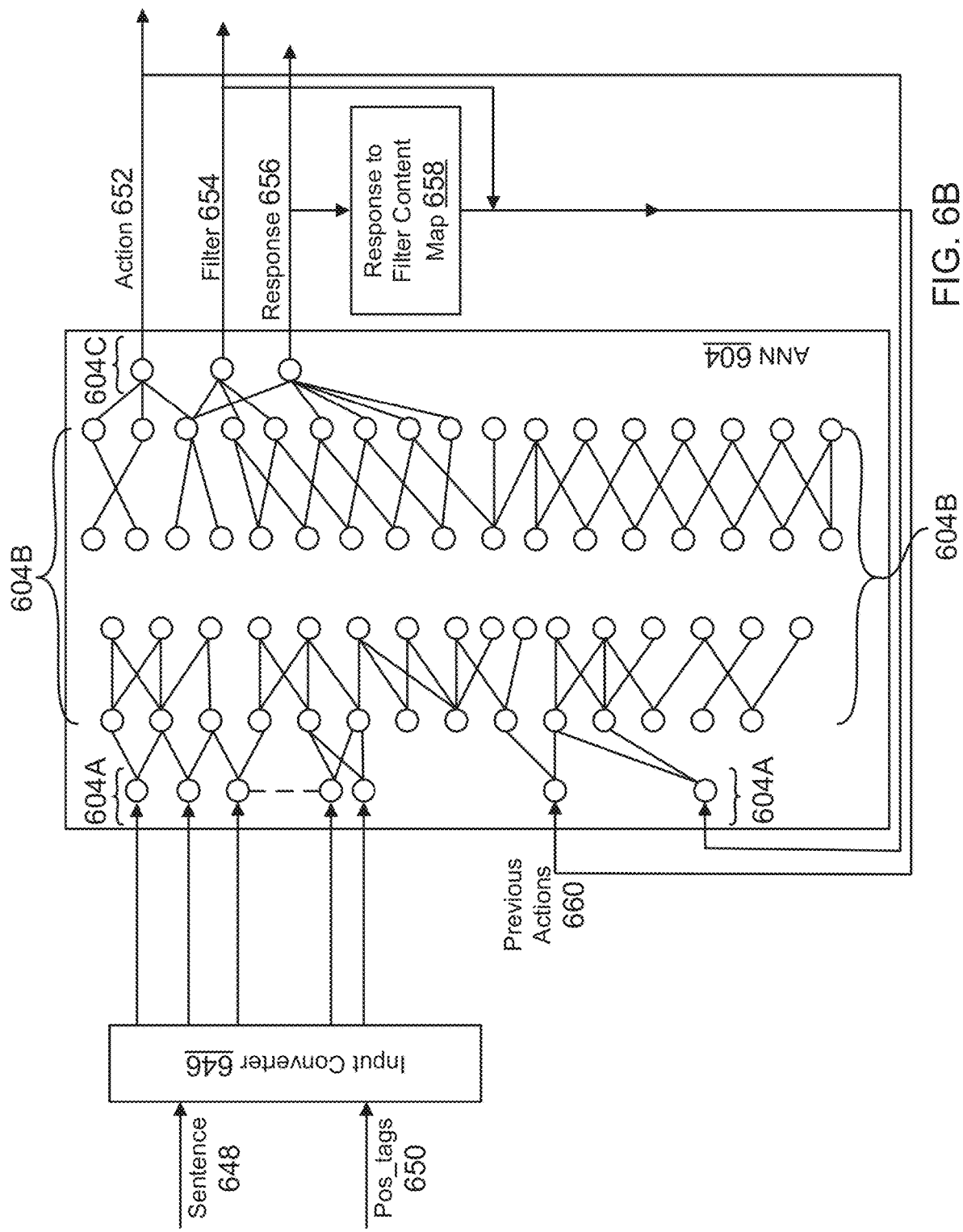
FIG. 6B shows an example of the neural network, according to one aspect of the present disclosure.
Figure 6C:
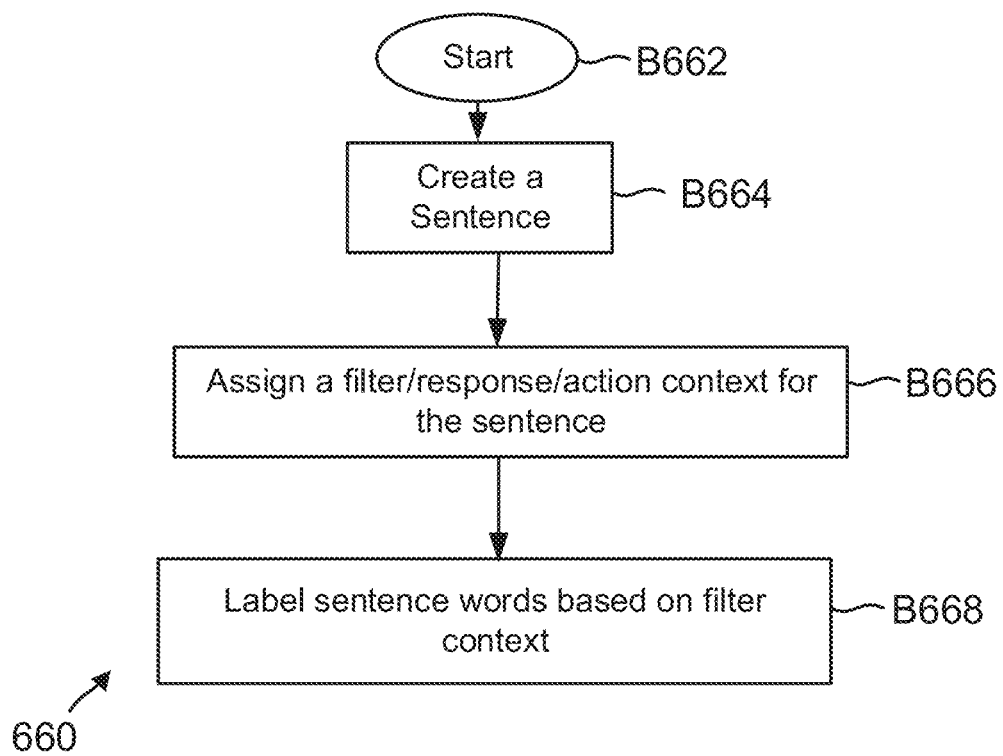
FIG. 6C shows an example of a process flow for training the neural network, according to one aspect of the present disclosure.
Figure 6D:

Neural Network 604: FIG. 6B shows an example of the neural network 604, according to one aspect of the present disclosure. FIG. 6C shows an example of a process for training the neural network 604, while FIGS. 6D-6E provide screen shots of a processor implemented training tool used for training the neural network 604, according to one aspect of the present disclosure.

In one aspect, neural network 604 interfaces with or includes an input converter 646 that receives an input sentence 648 (similar to the text input 366, FIG. 6A) and part of speech tags 650 from parser 364. The inputs are converted into vectors and then provided to the neural network 604.

As an example, the neural network 604 includes a plurality of layers 604A-604C with a plurality of interconnected "nodes" with an "activation function". Input vectors are presented to the neural network 604 via the input layer 604A, which communicates with one or more "hidden layers" 604B that performs vector processing using a system of weighted "connections". The hidden layers 604B are linked to an "output layer" 604C that generates an output, for example, an action context 652, filter context 654 and response context 656. The response context and filter contexts are mapped (shown as 658) and looped back to the neural network input layer 604A, shown as previous actions 660.

In one aspect, the neural network 604 uses a learning rule, which modifies weights of the connections according to input patterns. One example, of a learning rule is the "delta rule" using backwards propagation of error. With the delta rule, as with other types of backpropagation, "learning" is a supervised process that occurs with each cycle or "epoch" (i.e., each time the neural network 604 is presented with a new input pattern) through a forward activation flow of outputs, and backwards error propagation of weight adjustments. More simply, when the neural network 604 is initially presented with a pattern it makes a random "guess" as to what it might be. While the neural network 604 is being trained, it sees how far its answer was from the actual answer and makes an appropriate adjustment to its connection weights.

As an example, an input may be represented by:

$$I = f(\Sigma Wi * \text{Input})$$

A hidden layer node using a sigmoidal activation function generates an output. The output is then used to modify the weight of the input during training.

Once neural network 604 is "trained" to a satisfactory level it is deployed within an IFE system as part of system 600. The airline does not have to specify any training runs and instead allows the neural network 604 to work in a forward propagation mode. New inputs are presented to the input layer 604A and are processed by the middle layers 604B as though training were taking place, however, at this point the output is retained and no backpropagation may occur. The output of a forward propagation run is a predicted model for data, which can be used for future use and analysis.

FIG. 6C shows an example of a process 660 for training the neural network 604 at a computing device, for example, computing system 500, described above with respect to FIG. 5. Process 660 begins in block B662. In block B664, the input sentence 648 is created for the neural network 604. A filter, response and action context is assigned to the sentence in block B666. The sentence words are labelled based on the filter context B668. One example of training the neural network 604 is shown in the screen shots of FIGS. 6D and 6E that are now described below in detail.

FIG. 6D shows a screen shot of a training tool that is executed by a computing device, for example, the processing system 500 of FIG. 5. The executable code for the training tool is executed out of a memory device, for example, memory 504. The neural network 604 training is executed based on a set of operations. For example, in block 672, an intended action is selected. The intended action in this example is for searching media. Filter parameters for the action are set in block 674. In this example, the parameters are "media_search.conent_type" and "media_search.genre." A response is selected in block 676, for example, "media_search.get_title." A question is added for the intended action, filters and response in block 678. In this example, the question is shown as "List all horror movies."

The results of the training is sent to a server. The server for example, the onboard management system 344. The filter fields for this training are specified as "media.genre" and "media.content_type" and shown as 682.

FIG. 6E shows use of follow up questions for training the neural network 604 continuing with the example of FIG. 6D. Blocks 686, 688 and 690 are self-explanatory, based on the description of FIG. 6D above. In block B692, the follow question is shown as "what about comedies?". Blocks 694 and 696 are self-explanatory. Segment 698 shows an example of an output from the neural network 604 i.e. the action context, filter context and the response context. It is noteworthy that the examples of FIGS. 6D and 6E are simply shown how the neural network 604 may be trained for different action types and action contexts. It is not limited to the action context "media_search" or any other action context.

Figure 7A:
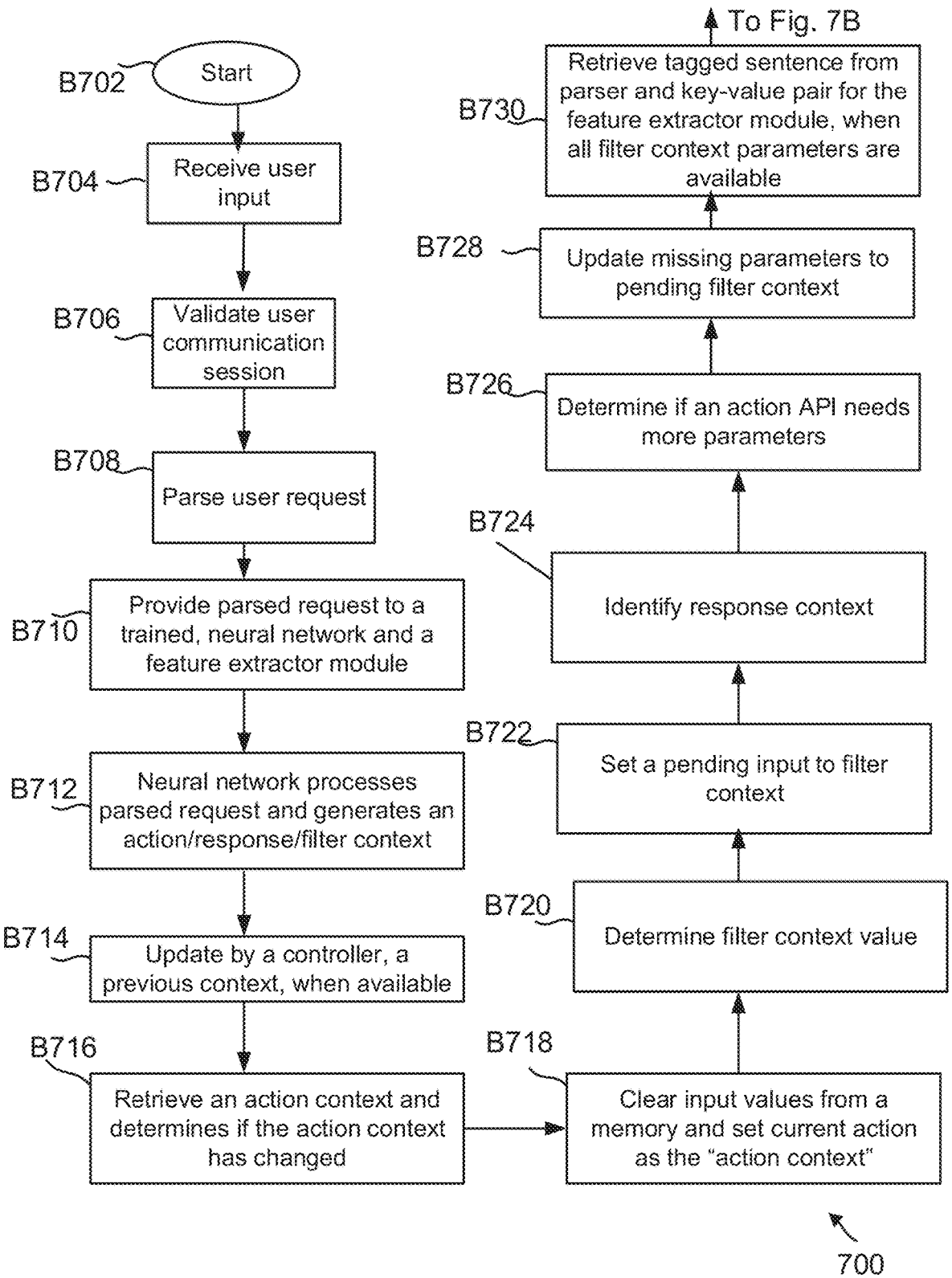
FIGS. 7A-7B show an example of a process flow for using the neural network, according to one aspect of the present disclosure.
Figure 7B:
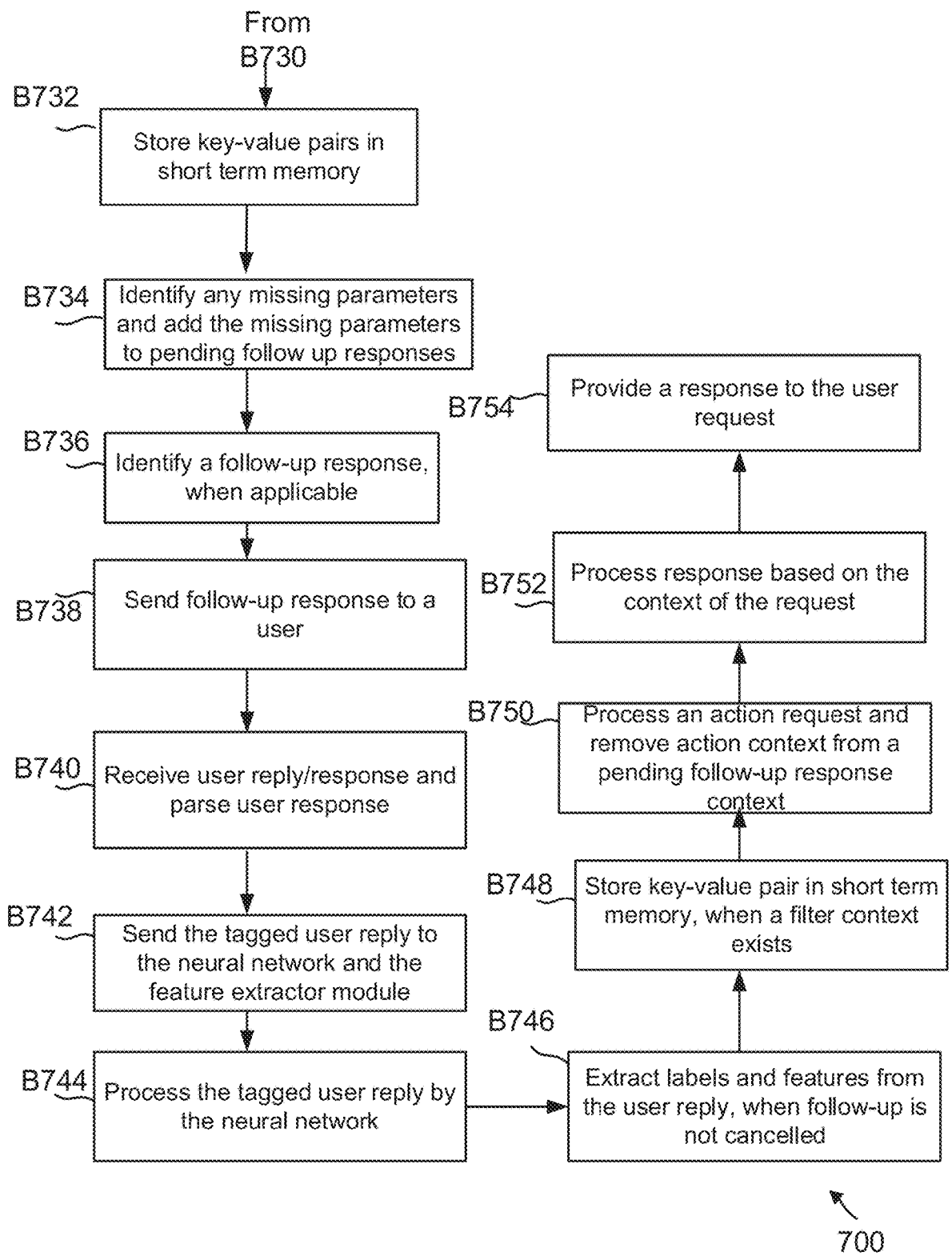

Process Flow:

FIGS. 7A-7B (may also be referred to as FIG. 7) show a process flow 700 for using system 600, according to one aspect of the present disclosure. The process blocks of FIG. 7 may be executed by system 600 components that may be implemented in software, hardware or a combination thereof.

Process 700 begins in block B702, when system 600 is installed on a seat device 326, server 345 and/or PED 302 and when the neural network 604 has been trained for one or more action categories/contexts, for example, in-flight entertainment, including media playback, shopping actions to buy products and services, flight information, reminder actions, interfacing with crew members for requesting services or any other action context type. The examples below are described for an action context that is based on "media search" for searching media accessible to or stored by the IFE system. The adaptive aspects of the present disclosure are not limited to any specific type of action or action context.

The filter context parameters for media-search may include:"media_search.cast, media_search.content_type, media_search.director, media_search.genre, media_search.title, media_search.rating, and media_search.year". The use of some of these filter parameters for training the neural network 604 is shown in FIGS. 6D and 6E, described above. Examples of a response context include: "media_search.get cast, media_search.get_content_type, media_search.get_director, media_search.get_genre, media_search.get_title, media_search.get_rating, media_search.get_year."

The action context maps to an API (624), while the filter parameters map to a query parameter of the API, and the response context maps to a response for a specific request.

An example of using the media-search API to respond to a user query is as follows. Assume that a user sends a request for: "List a movie directed by Brad Pitt." The action context for this query may be "media_search", the filter context parameters may be "media_search.director" and "media_search.content_type", and the response context may be "media_search.get_title". As described below, the response context can be paired with a filter parameter (e.g. filter parameter to value map 614A/614N, FIG. 6A) for asking context aware follow up questions. For instance, if the user started with the sentence "List a movie directed by Brad Pitt", and then had a follow up question of "when was it released?", the response context "media_search.get_title" becomes a filter parameter for "media_search.title" for a next request.

In block B704, a user request or question is received is from a user device (for example, PED 302 or seat device 326), for example, "List of movies by director." The request may be received as a voice commend or as text. If a voice command is received, then the voice command is converted into text by the voice to text module 362.

In block B706, the controller 606 validates the user request. In one aspect, the controller 606 verifies or generates a user session identifier 628 communicating with the user. If the session is invalid, the request is denied.

If the session is valid, then the process moves to block B708, when the user request is provided to the parser 364 that parses the user request and tags the user request. The parsed request is then provided to the feature extractor 602 and the neural network 604 in block B710.

In block B712, based on its training, the neural network 604 processes the tagged sentence and provides an output to the controller 606. In one aspect, the neural network 604 output includes an action context, filter context and a response context. For example, with respect to the user query, "List of movies by Director", the action context may be "media_search", the filter parameters may be "media_search.content_type" and "media_search.director", while the response context may be "media_search.get_title." In one aspect, since the neural network 604 is trained in the action context, as described above with respect to FIGS. 6C-6E, the neural network 604 output is generated with a high level of accuracy.

In block B714, the controller 606 updates a previous context, if available. To update the previous context, the controller 606 in block B716, first finds the action context (for example, media_search) and determines if the action context has changed for any reason. The controller 606 performs this task by using one or more data structure 627 that tracks a user session, as shown in FIG. 6A and described above in detail.

If the action context has changed, then in block B718, the controller 606 clears any input values from a memory that maintains the data structure. This memory is different from the short term memory 612. The current action context is then set as the latest action context.

In block B720, the controller 606 determines filter context parameters, for example, media_search.content_type and media_search.director, based on the aforementioned query. In block B722, pending inputs are set to the filter context parameter values.

In block B724, the controller 606 identifies the response context, for example, media_search.title.

In block B726, the controller 606 determines if the action context API (for example, 624) is missing or needs more parameters. This determination may be based on pre-configured parameters that may be needed for certain action contexts. The pre-configured parameters are pre-loaded and saved at a memory device (not shown) accessible to the controller 606. The missing parameters are added to the current context in block B728.

In block B730, the controller 606 retrieves tagged sentence values from a memory cache (not shown) and the key value pairs from the feature extractor 602, when all the filter context parameter values have been updated.

In block B732, the controller 606 stores key-value pairs (614A/614N) in the short term memory 612. The key-value pairs for the foregoing example may include: media_search.content_type (filter parameter)=movies (value) and media_search.director (filter parameter)=null(value)

In block B734, the controller 606 identifies any other missing filter context parameters, when applicable to any pending follow up questions/responses to the user request.

In block B736, the controller 606 identifies if there is a follow up question/response to the user query, for example, "Which Director". The follow up question is then sent to the user in block B738. The user reply is received in block B740 and parsed by the parser 364. The user response may be "Brad Pitt" or any other name.

The tagged reply by the parser 364 is again sent to the neural network 604 and the feature extractor 602 in block B742. For example, the tagged sentence is "Brad Pitt" and the context may be "media_search.director." The neural network 604 processes the tagged response in block B744 similar to process block B712, described above in detail.

In block B746, if a follow-up from the user has not been cancelled, labels from the user reply are extracted. An output from the feature extractor 602 is also extracted by the controller 606.

In block B748, key-value pairs for the reply are stored at the short term memory 612, when the filter context still exists and has not been cancelled.

In block B750, the action manager 610 processes the action request for the reply and the action context is removed from a pending follow-up response context that is maintained by the controller 606. The response is then processed in block B752, based on the context. In block B754, the response is provided to the user after being converted to a natural language by the natural language processor 646.

The process then looks for a next request either in the same action context or another action context.

In one aspect, using a trained neural network, enables the controller to efficiently process user requests. This improves communication with user devices and also provides better service for passengers.

Thus, methods and systems for a digital assistant on a transportation vehicle have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:

training a neural network for an action category on an aircraft associated with an intended user request by defining at least a filter parameter and a response context based on the filter parameter;

generating, by the neural network an action context that maps to an action application programming interface (API), based on the action category, a filter context and a response context for a tagged user input for a user session received by a processor executable, digital assistant on the aircraft;

wherein the action context identifies a type of action associated with the action category, the filter context defines one or more filter parameters that define a query parameter for the action API, and the response context provides information to extract from the action context to execute an action;

determining, by the digital assistant that the action context is a most current action context for the user session;

retrieving, by the digital assistant a missing parameter for the action API;

using, by the digital assistant, a short term memory configured as a least recently used memory for storing a key-value pair associated with the filter parameter of the filter context, based on an output of the neural network and the retrieved missing parameter;

wherein the short term memory stores key-value pairs for each user session with the digital assistant;

updating, by the digital assistant, the key-value pair at the short term memory after receiving a reply to a follow up request from the digital assistant and another output from the neural network; and providing, by the digital assistant, a response to the reply.

2. The method of claim 1, wherein the action context involves using a seat function controller that controls functions associated with an aircraft seat.

3. The method of claim 1, wherein the action context is for executing a shopping request using the seat device on the aircraft.

4. The method of claim 1, wherein the action context is for providing flight data to the user.

5. The method of claim 1, wherein the action context is for providing assistance by a crew member on the aircraft.

6. The method of claim 1, wherein the action context is to set a reminder for the user on the aircraft.

7. The method of claim 1, wherein a natural language processor generates the tagged user input.

8. A non-transitory machine-readable storage medium having stored thereon instructions for performing a method comprising machine executable code, which when executed by at least one machine, causes the machine to:
- train a neural network for an action category on an aircraft associated with an intended user request by defining at least a filter parameter and a response context based on the filter parameter;
- generate by the neural network an action context that maps to an action application programming interface (API) based on the action category, a filter context and a response context for a tagged user input for a user session, wherein the tagged user input is a user input for the user session transformed by a tag indicating a grammatical connotation;
- wherein the action context identifies a type of action associated with the action category, the filter context defines one or more filter parameters that define a query parameter for the action API, and the response context provides information to extract from the action context to execute an action;
- determine that the action context is a most current action context for the user session;
- retrieve a missing parameter for the action API;
- use a short term memory configured as a least recently used memory for storing a key-value pair associated with one or more of the filter parameter of the filter context based on the retrieved missing parameter for the action API for the most current action context and an output from the neural network; wherein the short term memory stores key-value pairs for each user session with the digital assistant
- update the key-value pair at the short term memory, after receiving a reply to a follow up request from the digital assistant and another output from the neural network; and
- provide a response to the reply.

9. The non-transitory machine-readable storage medium of claim 8, wherein the action context involves using a seat function controller that controls functions associated with an aircraft seat.

10. The non-transitory machine-readable storage medium of claim 8, wherein the action context is for executing a shopping request using the seat device on the aircraft.

11. The non-transitory machine-readable storage medium of claim 8, wherein the action context is for providing flight data to the user.

12. The non-transitory machine-readable storage medium of claim 8, wherein the action context is for providing assistance by a crew member on the aircraft.

13. The non-transitory machine-readable storage medium of claim 8, wherein the action context is to set a reminder for the user on the aircraft.

14. The system of claim 8, wherein the action context involves using a seat function controller that controls functions associated with an aircraft seat.

15. The system of claim 8, wherein the action context is for executing a shopping request using the seat device on the aircraft.

16. The system of claim 8, wherein the action context is for providing flight data to the user.

17. The system of claim 8, wherein the action context is for providing assistance by a crew member on the aircraft.

18. The system of claim 8, wherein the action context is to set a reminder for the user on the aircraft.

19. The system of claim 8, wherein the missing parameter is retrieved from a memory device different from the short term memory.

20. A system, comprising:
- a memory containing machine readable medium comprising machine executable code having stored thereon instructions; and a processor coupled to the memory configured to execute the machine executable code to:
- train a neural network for an action category on an aircraft associated with an intended user request by defining at least a filter parameter and a response context based on the filter parameter;
- generate by the neural network an action context that maps to an action application programming interface (API) based on the action category, a filter context and a response context for a tagged user input for a user session, wherein the tagged user input is a user input for the user session transformed by a tag indicating a grammatical connotation;
- wherein the action context identifies a type of action associated with the action category, the filter context defines one or more filter parameters that define a query parameter for the action API, and the response context provides information to extract from the action context to execute an action;
- determine that the action context is a most current action context for the user session;
- retrieving, by the digital assistant a missing parameter for the action API;
- use a short term memory configured as a least recently used memory for storing a key-value pair associated with one or more of the filter parameter of the filter context, based on the retrieved missing parameter for the action API for the most current action context and an output from the neural network;
- wherein the short term memory stores key-value pairs for each user session with the digital assistant
- update the key-value pair at the short term memory, after receiving a reply to a follow up request from the digital assistant and another output from the neural network; and
- provide a response to the reply.

\* \* \* \* \*